104401
Jas. Albaugh.
PATENTED JUN 21 1870
Potato Digger.
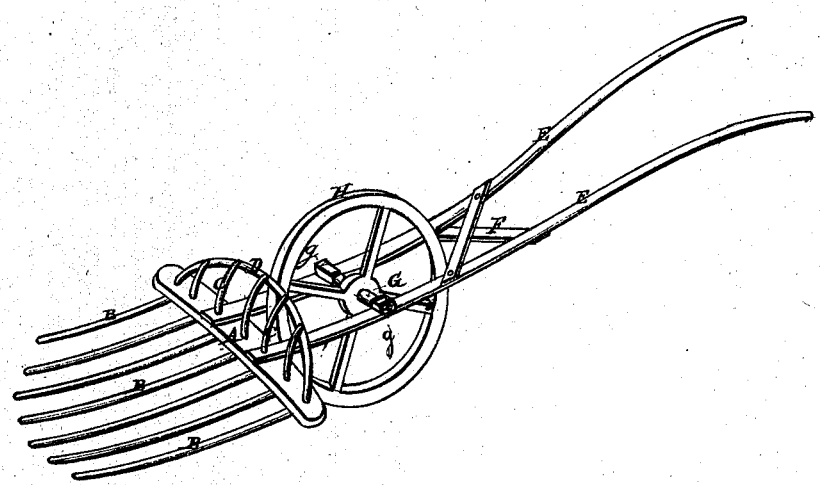
Witnesses.
Inventor
James Albaugh,
by Prindle and Dyer
Attys.

United States Patent Office.

JAMES ALBAUGH, OF LYONS, NEW YORK.

Letters Patent No. 104,401, dated June 21, 1870.

IMPROVEMENT IN POTATO-DIGGER.

The Schedule referred to in these Letters Patent and making part of the same.

*To all whom it may concern:*

Be it known that I, JAMES ALBAUGH, of Lyons, in the county of Wayne and State of New York, have invented certain new and useful Improvements in Potato-Diggers; and do hereby declare that the following is a full, clear, and exact description thereof, reference being had to the accompanying drawing making a part of this specification, in which is shown a perspective view of my improved device.

My invention has for its object the production of a cheap, durable, and efficient means whereby one operator can underrun a hill of potatoes, raise the same, and free the potatoes from the soil; and, to this end, It consists in the peculiar construction of the device, and the arrangement of its several parts, as is hereinafter set forth.

In the annexed drawing—

A represents a bar of metal, having secured to and projecting from its lower side a series of rods, B, the same being arranged parallel with each other and at a right angle to said bar.

Other rods, C, extending upward from the bar A, and connected at their upper ends to a bar, D, having the form of a flat arch, with its ends secured within the ends of said bar A, completes the digger and sifter, which is supported and operated by the following described devices:

Two metal bars E are secured at their front ends to the upper side of the bar A, and from thence extend backward and slightly upward and apart, so that their rear ends may furnish suitable handles for use of the operator.

Two diagonal braces F, attached to the bars E near their center, lengthwise, insure their relative positions laterally, and serve to strengthen the whole device.

Resting in suitable bearing g, upon the bars E, is a shaft, G, having secured thereon at its center, lengthwise, a wheel, H, of a sufficient size so that, when the operator is holding the handles at the ordinary height, the rods or tangs of the digger will just clear the ground.

The device is now complete, and is operated as follows:

The operator, grasping the handles, pushes the digger forward until a hill is reached, when, by slightly raising his hands, the tangs are caused to enter said hill and pass beneath the potatoes. A downward motion of the hands now raises the potatoes, from which any adhering soil may be removed by a slight shake, after which the digger may be run to any desired place and its load deposited.

The advantages of this device are that, by its use, one man can, without fatigue, perform as much labor as is possible for two men with ordinary utensils, in addition to which the work is more thoroughly done, and less liability exists to bruising the potatoes.

Having thus fully set forth the nature and merits of my invention,

What I claim as new, and desire to secure by Letters Patent, is—

A hand potato-digger, consisting of the bar A, the tangs B, the rods C, the curved bar D, the handles E, the shaft G, and the single wheel H, all constructed and arranged substantially as and for the purpose specified.

In testimony that I claim the foregoing I have hereunto set my hand this 22d day of February, 1870.

JAMES ALBAUGH.

Witnesses:
WM. VAN MARTER,
FRED. BENNETT.